United States Patent [19]

Merz et al.

[11] Patent Number: 5,342,873
[45] Date of Patent: Aug. 30, 1994

[54] REACTIVE HOT-MELT ADHESIVE

[75] Inventors: Peter W. Merz, Rüschlikon; Lutz Zabel, Birmensdorf; Christian Fischer, Zürich, all of Switzerland

[73] Assignee: Sika AG, vorm. Kaspar Winkler & Co., Zurich, Switzerland

[21] Appl. No.: 154,485

[22] Filed: Nov. 19, 1993

Related U.S. Application Data

[63] Continuation of Ser. No. 47,003, May 5, 1987, abandoned.

[30] Foreign Application Priority Data

May 9, 1986 [CH] Switzerland ............. 1902/86

[51] Int. Cl.$^5$ ............. C08K 3/26; C08K 3/36; C08L 75/04
[52] U.S. Cl. ............. 524/425; 524/447; 524/590; 525/129; 525/130; 525/457; 525/458
[58] Field of Search ............. 524/425, 447, 590; 525/129, 457, 458, 130

[56] References Cited

U.S. PATENT DOCUMENTS

| | | | |
|---|---|---|---|
| 2,814,606 | 11/1957 | Stilmar et al. | 525/458 |
| 2,953,489 | 9/1960 | Young | 524/590 |
| 3,401,141 | 10/1968 | Toth | 524/425 |
| 3,649,541 | 3/1972 | Ingersoll | 525/129 |
| 3,711,571 | 1/1973 | Farah | 525/458 |
| 3,763,274 | 10/1973 | Wang et al. | 524/590 |
| 3,829,533 | 8/1974 | Matsui et al. | 525/458 |
| 3,923,926 | 12/1975 | Harada et al. | 260/24.6 |
| 3,923,966 | 12/1975 | Harada et al. | 524/447 |
| 3,931,077 | 1/1976 | Uchigaki et al. | |
| 3,957,724 | 5/1976 | Schurb et al. | |
| 4,144,219 | 3/1979 | Malloy | 524/590 |
| 4,221,696 | 9/1980 | Cook et al. | 524/425 |
| 4,341,687 | 7/1982 | Ozeki et al. | 525/457 |
| 4,347,338 | 8/1982 | Torii et al. | 525/129 |
| 4,530,976 | 7/1985 | Kordomenos et al. | 525/457 |
| 4,585,819 | 4/1986 | Reischle et al. | 525/458 |
| 4,614,766 | 9/1986 | Schimmel et al. | |
| 4,622,369 | 11/1986 | Chang et al. | |
| 4,628,076 | 12/1986 | Chang et al. | |
| 4,692,479 | 9/1987 | Schneider et al. | 523/209 |
| 4,778,845 | 10/1988 | Tschan et al. | 524/710 |

FOREIGN PATENT DOCUMENTS

| | | | |
|---|---|---|---|
| 665361 | 6/1963 | Canada | 525/458 |
| 2401320C2 | 1/1974 | Fed. Rep. of Germany | |
| 3236313A1 | 4/1984 | Fed. Rep. of Germany | |
| 2232480 | 10/1987 | Japan | 524/425 |
| WO 81/00718 | 3/1981 | PCT Int'l Appl. | 525/457 |
| 87/00459 | 1/1987 | PCT Int'l Appl. | 524/590 |

*Primary Examiner*—Ana L. Carrillo
*Attorney, Agent, or Firm*—Burns, Doane, Swecker & Mathis

[57] ABSTRACT

A reactive, after cooling still viscous-plastic moldable hot-melt adhesive contains a mixture of
at least one thermoplastic material,
at least one binder on isocyanate basis, and
at least one thixotropic agent,
and the isocyanate content, referred to the total of the hot-melt adhesive, is in the range from 0.01 to 10 percent by weight.

5 Claims, No Drawings

REACTIVE HOT-MELT ADHESIVE

This application is a continuation, of application Ser. No. 07/047,003, filed May 5, 1987, now abandoned.

BACKGROUND OF THE INVENTION

1. Field of the Invention

The present invention refers to a reactive hot-melt adhesive.

Traditionally hot-melt adhesives (hot melts) are thermoplastic materials, which are heated for processing in a pistol or in another device to a temperature of 90°–200° C., and then are applied as a liquid mass to the substrates to be bonded.

During cooling the mass solidifies and quickly forms a stable bond.

The quick solidification and the lack of water and solvents are advantages of these hot-melt adhesives, compared with other adhesive systems.

But the thermoplastic behavior of hot-melts is a drawback, because the mechanical, and therefore adhesive characteristics, are strongly dependent on temperature. At an elevated temperature the hot-melt resoftens, and at a lower temperatures they tend to develop brittleness, and therefore, they may only be used in a more or less narrow temperature range.

In the last few years reactive polyurethane hot-melt adhesives have been introduced into the market. They are characterized in that after cross-linkage they lose their thermoplastic behavior and have good mechanical characteristics over a broad temperature range. Cross-linkage of the reactive isocyanate groups can be achieved with water, especially humidity, or with a heat liberated hydrogen-active compound.

The known solvent free, moisture hardenable prepolymeric isocyanates are liquid to soft-waxlike at room temperature and because of their low green strength and long reaction time have only limited possibilities for use.

2. Description of the Prior Art

From the DE-PS 2 401 320 there is known isocyanate-containing hot-melt adhesives composed of:

a) 20 to 73 percent by weight of an urethane prepolymer having terminal isocyanate groups on both ends, b) 2 to 25 percent by weight of a thermoplastic polymer selected from the group consisting of ethylenevinylacetate-copolymers, ethylene-acrylic acid-copolymers, ethylene-acrylate copolymers, atactic polypropylene and linear polyethyleneterephthalate-polymers, and c) 25 to 55 percent by weight of a tackifying resin, such as colophonium derivatives or terpene phenol-copolymers.

But at certain mixing ratios, mixtures of these components tend to be incompatible, have unstable molten masses, and have insufficient resistance to continuous stress. Also, the storage stability of these components is sometimes insufficient.

In DE-OS 3 236 313 there is described reactive hot-melt adhesives which are compatible, are melt stable, are storage stable mixtures in the absence of moisture, have great initial adhesion and have high thermostability. These reactive hot-melt adhesives were developed for the bonding of thermoplastic and duroplastic plastics, foam plastics, varnished surfaces, wood, paper, leather, rubber, textiles, metals, etc., and they consist of a mixture of:

a) 20 to 90 percent by weight of a prepolymeric isocyanate, b) 0 to 75 percent by weight of a thermoplastic polyurethane, and c) 5 to 50 percent by weight of a low molecular weight synthetic resin selected from the group consisting of ketone resins, ketone-aldehyde-condensation resins and/or hydrogenation products of acetophenone-condensation resins.

These reactive hot-melt adhesives with the above mentioned mixing possibilities are only limited non sag during coating (i.e., a coating thickness of more than 2 mm may not be guaranteed), are very tacky and string-like, and after cooling are viscous and have poor plastic moldability Therefore, they are limited to certain applications.

SUMMARY OF THE INVENTION

Hence, it is a general object of the present invention to overcome the insufficiencies of the art and to develop reactive hot-melt adhesives; which are non-sag during application; which after cooling to room temperature are touchable (i.e., not tacky) and plastically moldable; and which after cross linkage with water, especially moisture, have good mechanical (rubbery to viscous elastic) and adhesive characteristics, independent of the application temperature, i.e. the melting temperature or room temperature. Due to its stability, or to resistance to continuous stress during application, an enlarged field of application for the adhesive is accessible, especially adhesive bondings in the carmaking industry (e.g., adhesive bondings of windscreens), adhesive bonding of plastic strips, etc., and adhesive bonding in the production of marine vessels, e.g. adhesive bondings of wooden parts.

It is a further object of the present invention to provide a process for the preparation of the inventive hot-melt adhesive.

The inventive reactive, preferably room temperature viscous-plastic-moldable, hot-melt adhesive is characterized, in that it contains a mixture of at least one thermoplastic material, preferably in an amount from 20 to 90 percent by weight, especially from 50 to 65 percent by weight, at least one binder on isocyanate basis, preferably in an amount from 5 to 40 percent by weight, especially from 15 to 30 percent by weight, and at least one thixotropic agent, preferably in an amount from 3 to 30 percent by weight, especially from 8 to 20 percent by weight, and in that the isocyanate content, with reference to the total hot-melt adhesive mixture, is in the range of from 0.01 to 10 percent by weight, preferably in the range of from 0.1 to 1 percent by weight, especially in the range from 0.3 to 0.7 percent by weight.

Additionally, hot-melt adhesives according to the invention may contain at least one plasticizer, at least one filler and at least one additive, such as adhesion promoters, catalysts, etc.

Preferably these additional components are present in the following ranges:

the at least one plasticizer, preferably in an amount from 2 to 30 percent by weight, especially in an amount from 5 to 10 percent by weight, and/or the at least one filler, preferably in an amount from 5 to 50 percent by weight, especially in an amount from 8 to 15 percent by weight, and/or the at least one additive, preferably in an amount from 0.001 to 5 percent by weight, whereby said percentages are with reference to the total hot-melt adhesive mixture.

Further preferred examples of these additional components include:

plasticizers selected from the group, consisting of phthalates, such as dibutyl-, dioctyl-, dicyclohexyl-, diisooctyl-, diisodecyl-, dibenzyl- or butylbenzylphthalate, phosphates with up to 8 C-atoms in the alkyl group, such as trioctylphosphate; epoxy-containing plasticizers, toluenesulfonamides, chloroparaffines, adipic acid esters, castor oils, etc.;

fillers selected from the group consisting of silicic acid derivatives, gypsum, talcum, active charcoal, metal powder, chalks, kaolinites, carbon blacks, etc.;

an auxiliary agent or additive selected from a) adhesion promoters, especially silane-containing compounds, which may additionally contain at least one reactive group, such as epoxy-, isocyanate-, amine groups or double bonds, b) dyes or pigments, c) polyurethane catalysts, such as lead and/or tin compounds, occasionally combined with the use of further polyurethane catalysts, especially of tertiary amine-containing catalysts, d) UV-absorbing agents or stabilizers, such as phenolic antioxidants, screening agents, e) surface active additives, such as emulsifying agents, f) flame retardants, and g) fungistatic and/or bacteriostatic active substances.

Preferred binders for the present invention are polyurethane prepolymers, particularly those formed of the following components:

a) aromatic diisocyanates, such as, e.g., 4,4'-diphenylmethanediisocyanate, 2,4-toluene-diisocyanate, naphthylene-1,5-diisocyanate, 1,3- and 1,4-phenylenediisocyanate, and/or b) aliphatic or cycloaliphatic diisocyanates, such as hexamethylene-diisocyanate, 1,12-dodecanediisocyanate, cyclobutane-1,3-diisocyanate, cyclohexane 1,3- and -1,4-diisocyanate, 1-isocyanato-3,3,5-trimethyl-5-isocyanatemethylcyclohexane, 2,4- and 2,6-hexahydrotoluene-diisocyanate, hexahydro-1,3- and -1,4-phenyldiisocyanate, perhydro-2,4'and -4,4'diphenylmethane-diisocyanate, and c) polyoles having a molecular weight range from 400 to 10,000, preferably from 1000 to 5000, such as e.g. linear or branched polybutadienes,
polycarbonates,
polycaprolactones,
polycaprolactams, polyethers, e.g., polyethylene oxides, polypropylene oxides, polybutylene oxides, polystyrene oxides, polyepichlorohydrines, polytetrahydrofuranes, polyesters, e.g., any condensation products of multivalent alcohols (e.g. ethylene-glycol, propyleneglycol-1,2 and -1,3, butylene-glycol-1,4 and -2,3, hexanediol-1,6, octanediol-1,8, glycerin, trimethylolpropane, pentaerythrite, chinite, mannite and sorbite, methylglycoside, diethylene glycol, polyethylene glycols, dipropylene glycol, polypropylene glycols with multivalent carboxylic acids and/or carboxylic acid anhydrides and/or carboxylic esters), e.g., succinic acid, adipic acid, octanedioic acid, azelaic acid, sebacic acid, phthalic acid, isophthalic acid, trimellitic acid, phthalic acid anhydride, tetrahydrophthalic acid anhydride, tetrachlorophthalic acid anhydride, glutaric acid anhydride, maleic acid anhydride, fumaric acid, terephthalic acid-dimethylester and terephthalic acid-bis-glycol-ester, each having terminal, primary and/or secondary OH-groups, whereby the OH-functionality is preferably in the range of around 2, and/or d) short chain diols with terminal, primary and/or secondary OH-groups, such as, e.g., ethylene-glycol, bis-hexanediol-1,6,-propylene glycol, bis-hexapropylene glycol, diethyleneglycol, bis-hexa-ethylene-glycol.

Preferred thermoplastic materials in accordance with the present invention are polyamide resins, polyolefines, polyacrylates, polymethacrylates and polyurethane resins, especially those formed of the following components:

a) aromatic diisocyanates, such as, e.g., 4,4'-diphenylmethane-diisocyanate, 2,4-toluene-diisocyanate, naphthylene-1,5-diisocyanate, 1,3- and 1,4-phenylenediisocyanate, triphenylmethane-4,4',4''-triisocyanate, polyphenyl-polymethylenepolyisocyanates, and/or b) aliphatic or cycloaliphatic diisocyanates, such as, e.g., hexamethylene-diisocyanate, 1,2-dodecanediisocyanate, cyclobutane-1,3-diisocyanate, cyclohexane-1,3- and -1,4diisocyanate, 1-isocyanato-3,3,5-trimethyl-5-isocyanatemethylcyclohexane, 2,4- and 2,6-hexahydrotoluene-diisocyanate, hexahydro-1,3- and -1,4-phenyldiisocyanate, perhydro-2,4'- and -4,4'-diphenylmethane-diisocyanate, and c) polyoles having a molecular weight range of from 400 to 10,000, preferably of from 1000 to 5000, such as, e.g., linear or branched polybutadienes,
polycarbonates,
polycaprolactones,
polycaprolactams, polyethers, e.g., polyethylene oxides, polypropylene oxides, polybutylene oxides, polystyrene oxides, polyepichlorohydrines, polytetrahydrofuranes, polyesters, e.g., any condensation products of multivalent alcohols (e.g., ethylene-glycol, propyleneglycol-1,2 and -1,3, butylene-glycol-1,4 and -2,3, hexanediol-1,6, octanediol-1,8, glycerin, trimethylolpropane, pentaerythrite, chinite, mannite and sorbite, methylglycoside, diethylene glycol, polyethylene glycols, dipropylene glycol, polypropylene glycols) with multi-valent carboxylic acids and/or carboxylic acid anhydrides and/or carboxylic esters, (e.g., succinic acid, adipic acid, octanedioic acid, azelaic acid, sebacic acid, phthalic acid, isophthalic acid, trimellitic acid, phthalic acid anhydride, tetrahydrophthalic acid anhydride, tetrachlorophthalic acid anhydride, glutaric acid anhydride, maleic acid anhydride, fumaric acid, terephthalic acid-dimethylester and terephthalic acid-bis-glycol-ester) each having at least 2 terminal primary and/or secondary OH-groups, d) short chain diols with terminal, primary and/or secondary OH-groups, such as, e.g., ethylene-glycol, bis-hexanediol-1,6,-propylene glycol, bis-hexapropylene-glycol, diethyleneglycol, bis-hexa-ethylene-glycol, and/or e) cross-linking agents, such as, e.g., trimethylolpropane, glycerin, hexanetriol, triethanolamine, sorbite, mannite, sucrose, ethylene-amine, ethanolamine, hexamethyleneamine, pentaerythrite.

Preferred thixotropic agents according to the present invention include those selected form the group consisting of bentonite, carbon black, silicic acid derivatives, precipitated chalks, PVC, urea derivatives, acrylate derivatives, etc.

The inventive process for preparing the inventive reactive hot-melt adhesive is characterized by, under water-free conditions, placing or preparing in situ a thermoplastic material the thermoplastic material is then heated to the softening point, then the binder on isocyanate basis and the thixotropic agent is homogeneously added. The mixture is then cooled to ambient temperature. The mixing ratio of the thermoplastic material and the binder is such that the isocyanate content, referring to the total hot-melt adhesive mixture, is in the range of from 0.01 to 10 percent by weight.

In another embodiment of the invention, the thermoplastic material or binder can include a plasticizer, which may be present with the in situ forming thermoplastic material.

Additives and/or fillers may be added, preferably before cooling to ambient temperature, by homogeneous mixing.

The inventive reactive hot-melt adhesive may be used for bonding and/or sealing of one or more materials of the same or different origin to a composite.

The thermoplastic material may also be used to bond or seal the following:

any glass, especially glass plates for use in automotive vehicles, composite glass plates, front walls of glass, any metal, which may be varnished, metallized or otherwise coated and/or pretreated, e.g., bodies of automotive vehicles, any metal alloy, which may be varnished, metallized or otherwise coated and/or pretreated, e.g., bodies of automotive vehicles, any plastic, any construction material, especially stones, concrete, mortar, road pavings, and any wood.

Beside the direct application at the softening temperature this reactive hot-melt adhesive may be shaped at elevated temperature, for instance, with the aid of an extruder, to a profile of any shape, such as, e.g., a cord, a ribbon, etc. For dimensional stability there may be incorporated into the cord or the ribbon a thread or a screen of any material.

For bonding these preformed cords may be applied manually without the use of machines. Which compared with paste like materials is cheaper, safer in quality, quicker and cleaner.

These reactive cords may be spirally wound and may be stored in an aluminum bag, as a water vapor barrier, and thus may be used in the Do-it-yourself market.

The following example shall illustrate the invention. The parts mentioned herein are referred to by weight.

EXAMPLE

1. Preparation of a Polyurethane Thermoplastic material

A mixture of 2400 parts of a polyoxpropylene etherdiol (with a molecular weight of 2000), 320 parts of diisooctylphthalate and 4 parts of a 5% 1,4-diazabicyclo-octane (DABCO) in diisooctylphthalate solution are suspended at room temperature. 697.6 parts of 4,4'-diphenylmethanediisocyanate, and the suspension are heated to a temperature of 80° C. with stirring and with the exclusion of moisture, whereby the crystalline 4,4' diphenylmethanediisocyanate is dissolved.

After about 150 minutes there was added 107.8 parts of 1,4-butane diol. The reaction mixture after a temperature increase to about 100° C. was stirred for about 1 hour up to the consistency of the isocyanate content.

2. Preparation of the Reactive Hot-Melt Adhesive

At a temperature of 100° C. there were added successively to the above mentioned thermoplastic material 894.8 parts of a prepolymeric isocyanate having an isocyanate content of 2.23%, and which is composed of the components polyoxypropylene ether triol of the molecular weight of 5000 and 4,4'-diphenylmethanediisocyanate, 20 parts of a silane containing compound and 490 parts of carbon black, dried at a temperature of 130° C. This non-string-like mass is slightly tacky and non-sag at the preparation temperature, and at room temperature it is touchable and plastically moldable.

The following analytical data were obtained after two weeks' storage of the mass at a temperature of 23° C. and a 50% relative humidity:

| | | |
|---|---|---|
| Shore hardness A | 40 | (DIN 53505) |
| tensile strength [N/$nm2$] | 7.7 | (DIN 53504) |
| breaking elongation [%] | 936 | (DIN 53504) |
| breaking stress [N/$nm2$] | 7.7 | (DIN 53504) |
| further breaking strength [N/$nm2$] | 16.8 | (DIN 53515) |
| tensile shear strength [N/$nm2$] | >5 | cohesive rupture |

(Specimens were prepared from a mass preformed into beads and cooled to room temperature in an inert gas atmosphere)

| | |
|---|---|
| Adhesion cement to cement | fulfilled |
| open lying time of the bead | about 20 minutes |
| specific resistance opposition to electric flow $\sigma$ D [$\Omega$ cm] | $4,8.10^{11}$ (DIN 53482) |
| surface resistance R$_D$ [$\Omega$] | $1.6.10^{12}$ (DIN 53482) |
| The cured mass is coatable. | |
| Use temperature | $-40°$ C. to $+90°$ C. (temporarily up to $+150°$ C.) |

While there are shown and described present preferred embodiments of the invention, it is to be distinctly understood that the invention is not limited thereto, but may be otherwise variously embodied and practiced within the scope of the following claims.

We claim:

1. A thixotropic, thermoplastic, reactive hot-melt adhesive composition which is cross-linkable by reaction with water, is non-sag upon application, is soft at elevated temperatures but loses its thermoplastic behavior upon cross-linkage, and is plastically moldable, said adhesive comprising from 20 to 90 percent by weight of at least one polyurethane thermoplastic material., 5 to 40 percent by weight of at least one prepolymeric binder having reactive isocyanate groups, wherein the isocyanate content with reference to the total reactive hot-melt mixture is within the range from 0.1 to 10 percent by weight and wherein the isocyanate groups are reactable with water to cross-link the adhesive composition and render the adhesive non-thermoplastic, and from 3 to 30 percent by weight of at least one thixotropic agent to render the adhesive composition non-sag upon application.

2. A reactive hot-melt adhesive according to claim 1, wherein the isocyanate content is in the range from 0.1 to 1 percent by weight.

3. A reactive hot-melt adhesive according to claim 2 wherein the isocyanate content is in the range from 0.3 to 0.7 percent by weight.

4. A reactive hot-melt adhesive according to claim 1, wherein the binder is selected from the group of the reactive polyurethane prepolymers.

5. A reactive hot-melt adhesive according to claim 1, comprising from 3 to 30 percent by weight of at least one thixotropic agent selected from bentonite, carbon black, silicic acid thixotropic agents, precipitated chalks, polyvinyl chlorides, urea thixotropic agents or acrylate thixotropic agents.

* * * * *